May 1, 1923.
E. A. LE BEAU
1,453,684
THIRD OR FOURTH POINT SUSPENSION SUPPORT MOUNT OR BRACKET FOR BRAKE BEAMS
Filed Aug. 2, 1921
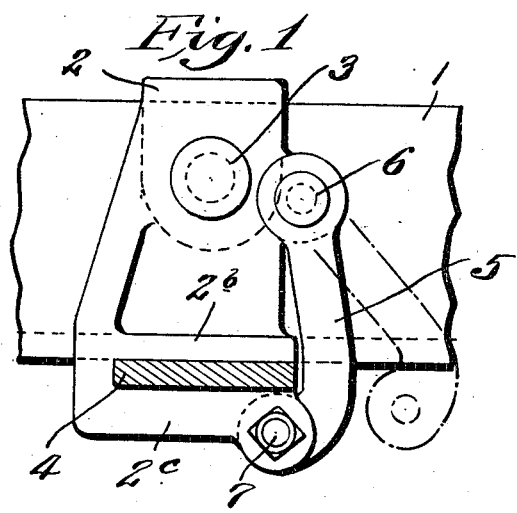
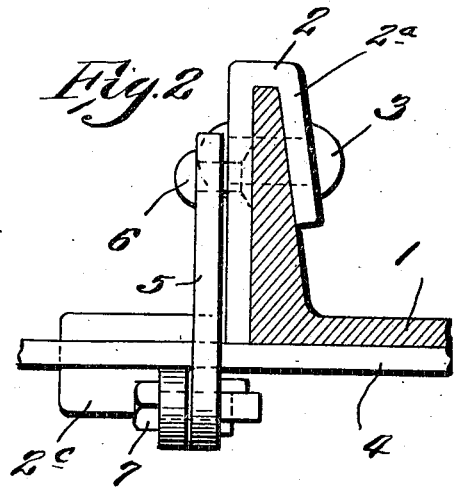
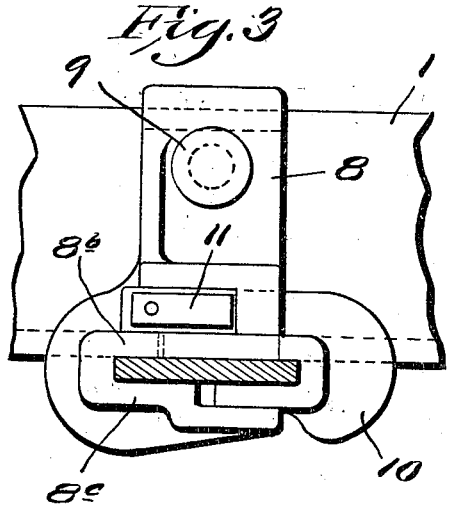
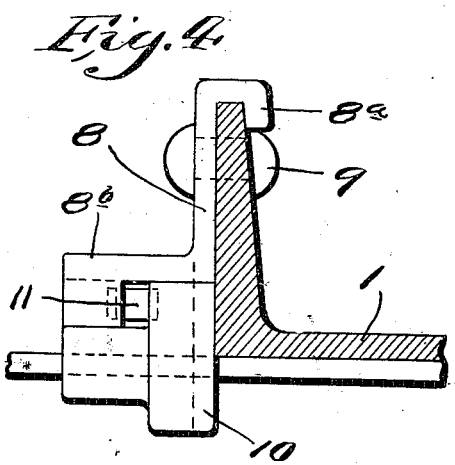
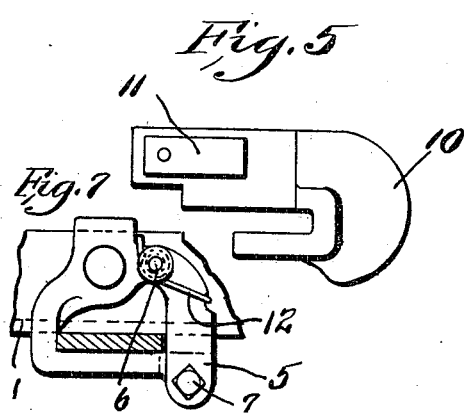
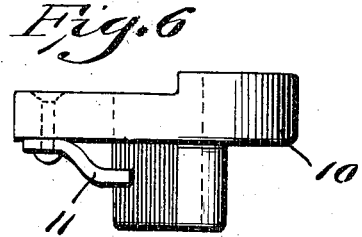
Inventor
Ernest A. Le Beau Patented May 1, 1923.

1,453,684

UNITED STATES PATENT OFFICE.

ERNEST A. LE BEAU, OF CHICAGO, ILLINOIS, ASSIGNOR TO CHICAGO RAILWAY EQUIPMENT COMPANY, OF CHICAGO, ILLINOIS, A CORPORATION OF ILLINOIS.

THIRD OR FOURTH POINT SUSPENSION SUPPORT MOUNT OR BRACKET FOR BRAKE BEAMS.

Application filed August 2, 1921. Serial No. 489,241.

*To all whom it may concern:*

Be it known that I, ERNEST A. LE BEAU, a citizen of the United States, residing at the city of Chicago, county of Cook, and State of Illinois, have invented a certain new and useful Improvement in Third or Fourth Point Suspension Support Mounts or Brackets for Brake Beams, of which the following is a full, clear, and exact description, such as will enable others skilled in the art to which it appertains to make and use the same, reference being had to the accompanying drawings, forming part of this application, in which,—

Figure 1 is a side elevational view of my improved brake beam third or fourth point suspension support mount or bracket.

Figure 2 is an edge elevational view of the same.

Figure 3 is a side elevational view of a modified form.

Figure 4 is an edge elevational view of the form shown in Figure 3.

Figure 5 is a detail view of the sliding member shown in Figure 3.

Figure 6 is a top plan view of said sliding member.

Figure 7 is a side elevational view of another modified form of my invention.

This invention relates to a new and useful improvement in third or fourth point suspension support mounts or brackets for brake beams, being designed particularly as an improvement on the form of mounts shown in the patents to Williams, No. 1,080,741, dated December 9, 1913, and No. 1,126,238, dated January 26, 1915, the object of my present invention being to arrange a mount which can be applied to the side edge of the spring plank of a truck, which mount is composed of articulated members, one of which may be gravitating whereby it will swing to its closed position, there being means for locking and holding said closing member in position and said locking means may be yielding, if desired.

In the drawings, 1 indicates the spring plank of a car truck, here shown as being in the form of a channel to which the bracket member 2 is secured by means of a rivet 3. This bracket member is provided with an overhanging lip $2^a$ at its upper end, while its lower end is formed with two jaws $2^b$ and $2^c$, said jaws providing a recess into which a third or fourth point supporting spring or track 4 is received.

5 indicates a member pivoted by means of a rivet 6 to the member 2, said member 5 being movable in a transverse plane relative to the longitudinal axis of the support 4. The lower end of this gravitating member 5 is provided with a perforation to receive a pin 7 by which member 5 is locked in its closed position.

To remove the support 4, it is only necessary to take out the pin 7, raise the member 5 and then move the support 4 laterally to disengage it from its recess and then downwardly away from the spring member.

In Figures 3 to 6, I have shown a modified form of my invention in which the attaching bracket member 8 is secured to the spring plank 1 by means of a rivet 9. This bracket member 8 is provided with an overhanging lip $8^a$ to engage the flange of the spring plank. The lower portion of the bracket member 8 is provided with two jaws $8^a$ and $8^c$ on each side of which are guideways to receive a sliding member 10 which acts as a closure for the open side of the recess between the jaws. Guideways are provided in the bracket member 8 for the movable member 10, and said member 10 is provided with a flat leaf spring 11 designed to co-operate with a shoulder on the bracket member 8 in such a manner as to form a yielding lock to hold the member 10 in its closed position.

In Figure 7, I have shown a structure similar to that disclosed in Figures 1 and 2 except that there is a torsion spring 12 arranged about the pivot 6 and engaging the gravitating member 5, whereby should the locking pin 7 be lost or broken, the spring 12 will tend to hold the member 5 in its closed position.

What I claim is:

1. A brake beam third or fourth point suspension support-mount comprising two articulated members designed to hold the support in position by engaging it on all sides.

2. A brake beam third or fourth point suspension support-mount comprising a member provided with an open jaw, and a member pivotally movable in a direction transversely of said jaw to close it.

3. A brake beam third or fourth point suspension support-mount, comprising two pivotally connected members, forming a closed seat for the brake beam support and means for holding said members in a closed position.

4. A brake beam third or fourth point suspension support-mount comprising two pivotally connected members, and means for holding said members in a closed position.

5. A brake beam third or fourth point suspension support-mount comprising a member having a recess adapted to receive the support and a permanently connected member movable at an angle, relative to the support, for holding it in said recess.

6. A brake beam third or fourth point suspension support-mount comprising a member having a recess adapted to receive the support, a member for holding the support in said recess, and yielding means for locking the last named member in place.

7. A brake beam third or fourth point suspension support-mount, comprising two members, one of which is adapted to be connected to a part of the car truck, and the other of which is a gravitating support-engaging member.

8. A brake beam third or fourth point suspension support-mount comprising a member having two jaws adapted to receive the support, and a member for closing the opening to said jaws.

9. The combination of a spring plank, a third or fourth point brake beam support, an open jawed bracket on the spring plank for holding said support in position and permitting its removal by a lateral and downward movement, and means for holding said support against movement.

In testimony whereof I hereunto affix my signature this 25th day of July, 1921.

ERNEST A. LE BEAU.